E. W. C. Vanderveer,
Earth Closet.
No. 109,276.        Patented Nov. 15, 1870.

Witnesses
S. S. Giddings
E. C. Hinman

Inventor
Elias W. C. Vanderveer

United States Patent Office.

ELIAS W. C. VANDERVEER, OF LINDEN, NEW JERSEY.

Letters Patent No. 109,276, dated November 15, 1870.

IMPROVEMENT IN EARTH-CLOSETS.

The Schedule referred to in these Letters Patent and making part of the same.

*To all whom it may concern:*

Be it known that I, ELIAS W. C. VANDERVEER, of Linden, in the county of Union, in the State of New Jersey, have invented a new and improved Form of Earth-Closet; and I do hereby declare that the following is a full and exact description thereof, reference being had to the accompanying drawing and to the letters of reference marked thereon.

The nature of my invention consists in a sliding valve for opening and closing the lower aperture of a hopper or earth-reservoir, to which valve is fastened a box, having a loose bottom hinged at its rear extremity, said bottom being supported by and moving on a roller, which causes it to rise and fall, to allow the earth to pass from the box to the pan resting under the seat. Also in providing a flexible back to the earth-reservoir, to keep the earth loose and facilitate its passage from the reservoir to the aforementioned box.

To enable others skilled in the art to make and use my invention, I will proceed to describe its construction and operation.

I construct my earth-reservoir, A, (see accompanying drawing,) in the usual form, with the exception of the back, B, which is attached to the sides by means of wide leather bands, as by reference to the accompanying drawing will more fully appear.

Figure 2:
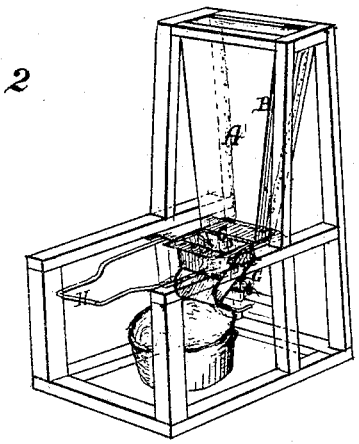
Figure 1:
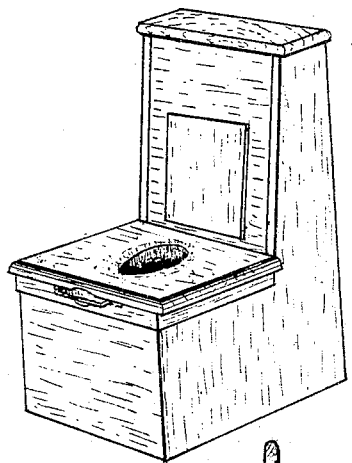
Figure 4:
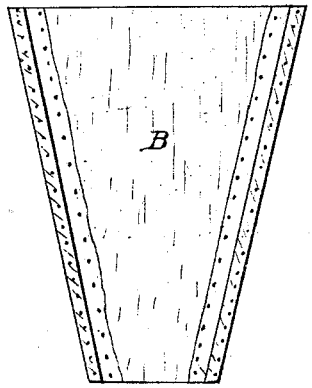
Figure 3:
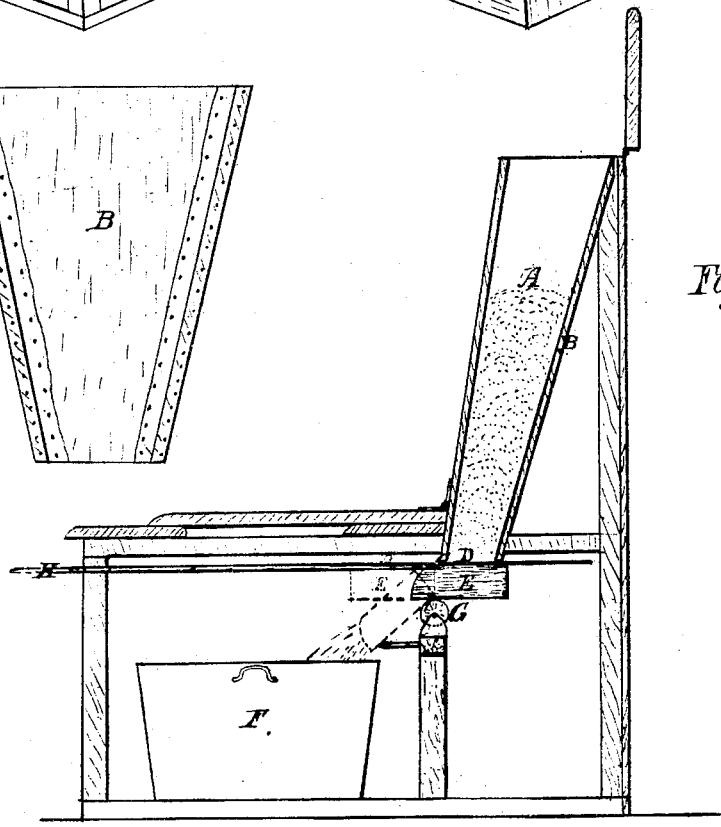

In order that the proper quantity of earth may be thrown from the reservoir to the pan under the seat, I provide a sliding valve, C, operated by a handle, H, having an opening at D, communicating with the box E, whence, on the valve or slide being drawn forward, the earth is ejected into the pan F. The valve and box being in the first position shown in Figure 3, the opening in the valve is brought directly under the lower aperture of the reservoir, and the communication between the reservoir A and the box E being free, the earth settles by the force of gravity into the box until it is filled, the bottom being supported by the roller G. The valve being then drawn forward, by means of the handle H, to the second position, as shown in Figure 2, and by dotted lines in fig. 3, the lower opening of the reservoir is closed, thus shutting off the flow of earth from the same, and the bottom of the box being no longer supported by the roller G, falls to the position shown in the drawing, and the earth is thereby ejected into the pan F.

What I claim as my invention, and wish to secure by Letters Patent, is—

The flexible back B, together with the sliding valve C, and box E, with hinged bottom, supported by and moving on the roller G, substantially as and for the purposes described.

ELIAS W. C. VANDERVEER.

Witnesses:
    S. S. GIDDINGS,
    E. C. HINMAN.